| United States Patent [19] | [11] 3,863,015 |
| Kanda | [45] Jan. 28, 1975 |

[54] PROCESS FOR THE PREPARATION OF EDIBLE PROTEIN FIBERS

[75] Inventor: Hiroshi Kanda, Zushi, Japan

[73] Assignee: The Nisshin Oil Mills, Ltd., Tokyo, Japan

[22] Filed: Nov. 22, 1972

[21] Appl. No.: 308,781

[30] Foreign Application Priority Data
Dec. 29, 1971 Japan.................................. 46-3236

[52] U.S. Cl. .............................................. 426/276
[51] Int. Cl. .............................................. A23j 3/00
[58] Field of Search .................................... 426/276

[56] References Cited
UNITED STATES PATENTS
2,730,448  1/1956  Boyer et al. ........................ 426/276
3,455,697  7/1969  Atkinson........................... 426/276 X

*Primary Examiner*—James R. Hoffman
*Attorney, Agent, or Firm*—McGlew and Tuttle

[57] ABSTRACT

Edible protein fibers are prepared by peptizing a water dispersion of isolated soybean proteins with an alkaline material, extruding said peptized dope into a buffer solution having a pH of about 4.2 to 4.6 and heat treating the thus obtained fibers without stretching with a hot water having a temperature of about 80°C or more for a time of period of from 0.5 to 10 minutes.

7 Claims, No Drawings

PROCESS FOR THE PREPARATION OF EDIBLE PROTEIN FIBERS

BACKGROUND OF THE INVENTION

1. Field of the Invention

The present invention relates to preparation of edible protein fibers with high elasticity and flexible chewiness and an improved process for preparing said fibers.

2. Prior Art

The manufacture of meat-like foodstuffs from an animal or vegetable protein has been recently carried out by spinning the protein dope to obtain fibers and adding fats, binders and various flavouring agents to the thus obtained fibers. It is well known that, as understood from a microscopic observation of a natural meat, the intrinsic texture and chewiness characteristics of natural meat are due to the congregated minute filaments which are oriented. It is also known that the natural meat is rich in elasticity because the filament itself is composed of the specific structure of fine myofibrils. The mere step of making fibers from the protein and then fixing them with binders affords an orientation or texture in the fibers, but is not sufficient to produce meat-like foodstuffs. This is so because, it is required for meat-like foodstuffs to obtain elasticity for the fibers.

Generally, animal or vegetable protein fibers are prepared by adding an alkaline material to a dispersion of the protein to form a peptized dope, spinning said dope having a proper viscosity, concentration and pH through nozzles of 0.06 to 0.3mm in diameter into a coagulating bath having a pH of 4.0 or less said bath consisting of acids and salts, and then neutralizing and washing the resulting fibers as they are, or after they have been subjected to a stretching treatment in a salt solution to get the stiffness out of them. The so obtained fibers in general have considerable stiffness, but lack the elasticity and flexibility as foodstuffs and therefore the chewiness was not satisfactory.

OBJECT OF THE INVENTION

An object of the present invention is to provide a process for the preparation of edible protein fibers with high elasticity and flexible chewiness.

SUMMARY OF THE INVENTION

It has been found that important features of the invention comprise unfolding sufficiently spherical protein molecules in the peptizing step by an alkaline material, forming fibrous molecules by coagulation in the spinning step, and if desired, stretching the resulting fibrous molecules to afford an orientation, and immediately thereafter subjecting the fibers to a sudden heat-denaturing treatment to shrink them. These features are important for providing animal or vegetable protein fibers with a high elasticity and flexible chewiness.

The present invention is based on the discovery of the above mentioned features. The essential process of the invention is characterized by restricting the pH of the coagulating bath during spinning within a range of from about 4.2 to about 4.6 and if desired, stretching the resulting fibers, for example, to the extent of 200 to 400%, and immediately thereafter treating the fibers thus obtained without stretching with hot water at a temperature of about 80°C or more for a time of period of from 0.5 to 10 minutes to heat-denature them. Such a sudden heat-denaturing makes the fibers insoluble and at the same time shrinks them sufficiently to achieve the object of the invention.

DETAILED DESCRIPTION

The step of treating the fibers immediately after spinning and the optional stretching steps with hot water treatment at a temperature of about 80°C or more is important in the process of the present invention. In the case of fibers which are extruded into and spun through a coagulating bath having a pH of 4.0 or less as employed in the conventional spinning processes, it is impossible to make the protein insoluble by heat-denaturing for the purpose of having the fibers hold elasticity because solubilization of fibers occurs during this the heat-denaturing treatment.

In other words, the pH of the aqueous acida coagulating bath during spinning must always be maintained in the proximity of the isoelectric point of the protein to be used. The protein used in the present invention are soybean proteins and the pH of the coagulating bath should be, therefore, restricted to the range of from about 4.2 to about 4.6. In the case when the pH of the acid solution is the above about 4.6, the coagulation of the protein is not satisfactory and the so obtained fibers are inferior in stiffness so that it is difficult to effect a series of spinning procedures and the subsequent heat-denaturing and scouring steps including neutralization. As mentioned above, in the case when the pH is below about 4.2, no heat-denaturing takes place or the solubilization of fibers occurs when the spun fibers are poured into the hot water.

Some acids which are useful in the coagulating bath include inorganic acids such as hydrochloric acid and phosphoric acid, and organic acids such as acetic acid, succinic acid, lactic acid and fumaric acid. According to the present invention, acids exhibiting the buffer action at a pH ranging from about 4.2 to about 4.6, preferably such as acetic acid and succinic acid, are used as the acid component of the coagulating bath. Acids having such buffer action alone can, of course, be used and also may be used in mixture with other organic acids such as furmaric acid and lactic acid or inorganic acids such as hydrochloric acid and phosphoric acid. The content of said acid component either alone or in and mixture without acids should be within the range of at least about 2% by weight based on the total amount of the coagulating bath. Furthermore, the salt component of said coagulating bath sodium chloride, sodium sulfate and the like may be used. Preferred content of the salt component in the coagulating bath is about 5% by weight or more.

According to the present invention, a protein peptized dope having a pH of 11.5~13.0 and concentration of 10~15% by weight obtained by the conventional methods is extruded through nozzles of 0.06~0.3 mm in diameter into a coagulating bath consisting of an acid having the specific pH range of from about 4.2 to about 4.6 and a salt to form fibrous proteins and optionally followed by stretching same to the extent of 400%. In this connection, the larger the extent of stretching, the larger the order of shrinkage of fibers by the subsequent treatment with hot water, and accordingly the fibers thus obtained have high elasticity and flexible chewiness. The stretching may be carried out in a liquid or air in the conventional manner and stretching by heat may conveniently be used. The fibers thus obtained are immediately thereafter treated with hot water at a temperature of about 80°C or more without stretching for a time period of 0.5 to 10 minutes to heat-denature the fibers, whereby the proteins are made insoluble and at the same time suddenly the fibers are shrunk. In this connection when the temperature of the hot water is below about 80°C, it is difficult to heat-denature the fibers and accordingly the so obtained fibers are quite inferior in elasticity because there is no shrinkage.

Thus, the fibers shrink to a size of the order of 50 to 90% of the length of the fibers before heat-denaturing and these fibers have sufficient elasticity as they are. Then, for use in foodstuffs the fibers are neutralized with an alkaline material to a pH of 5.5 to 7.0 and washed by water. When elasticity is estimated by measurement of elongation of fibers, it is possible to obtain fibers possessing an elongation as high as 300 to 600%. Accordingly an elastic, flexible chewiness of fibers is obtained according to the present invention, while the fibers obtained by conventional methods have an elongation of 150 to 200% and accordingly become fragmentary without elasticity when chewed.

The following examples are indicated for the purpose of illustration only and are not to be construed as placing any limitation on the scope of the present invention.

EXAMPLE 1

10 kgms. of an isolated soybean protein curd obtained by any of the methods known in the art were peptized by adding sodium caustic, were prepared so that 18 kgms. of the peptized dope having a pH of 11.8 and a protein content of 13% by weight. Then, the peptized dope was extruded through a nozzle having 2,000 holes each of the order of 0.08mm in diameter into a coagulating bath having compositions as indicated in Table 1 below with a linear velocity of about 10 meters per minute. After spinning, the fibers were stretched to a size of the order of 200% longer and immediately thereafter poured into hot water preheated to a temperature of 85°C without stretching. The heat-treatment was conducted for 3 minutes.

Tests on the heat-denaturing and shrinkage of the fibers thus obtained were carried out for each coagulating bath. The results and observations are shown in Table 2. As understood from Table 2, the fibers obtained from the coagulating bath having a pH of about 4.2~4.6, namely, Run Nos. 3,4 and 5 had good results.

Table 1

Coagulating bath composition and pH

| Run | Bath composition | | Adjusted by sodium caustic to: |
|---|---|---|---|
| 1 | Acetic acid, 5% | Sodium chloride, 5% | pH 3.8 |
| 2 | Acetic acid, 5% | Sodium chloride, 5% | pH 4.0 |
| 3 | Acetic acid, 5% | Sodium chloride, 5% | pH 4.2 |
| 4 | Acetic acid, 5% | Sodium chloride, 5% | pH 4.4 |
| 5 | Acetic acid, 5% | Sodium chloride, 5% | pH 4.6 |
| 6 | Acetic acid, 5% | Sodium chloride, 5% | pH 4.8 |

Table 2 pH of coagulating bath and appearance of fibers

| Run | pH of coagulating bath | Situation of heat-denaturing and shrinkage* |
|---|---|---|
| 1 | 3.8 | Fibers soluble. |
| 2 | 4.0 | Fibers swell and no heat-denaturing take place. |
| 3 | 4.2 | Fibers are heat-denatured and shrinked to about two-thirds. |
| 4 | 4.4 | Fibers are heat-denatured and shrinked to about a half. |
| 5 | 4.6 | Fibers are heat-denatured and shrinked to about two-thirds. |
| 6 | 4.8 | Fibers are too breakable to spin. |

* Against the length of fibers before the heat-denaturing

EXAMPLE 2

10 kgms. of an isolated soybean protein curd obtained by any of the methods known in the art were peptized by adding sodium caustic so that 15 kgms. of the peptized dope having a pH of 12.5 and a protein content of 15.0% by weight were prepared. Then, the peptized dope was extruded through a nozzle having 12,000 holes each on the order of 0.10mm in diameter into a coagulating bath composed of water containing 5% by weight succinic acid and 10% by weight sodium chloride, having a pH of 4.3. After spinning, the fibers were stretched to a size of the order of 300% longer and immediately poured into hot water preheated to a temperature of 40°C, 60°C, 80°C and 95°C each without stretching. After heat-treatment for 5 minutes, the fibers were neutralized with sodium carbonate to a pH of 6.0, and thus edible protein fibers were obtained.

The fibers obtained in this way were examined by an elongation test in which elasticity is estimated and an organoleptic test in comparison with fibers obtained by conventional spinning methods. The results are shown in Tables 3 and 4. As understood from Tables 3 and 4, the fibers obtained according to the present invention, namely Run Nos. 12 and 13 are superior in elasticity.

Table 3

Elongation and appearance of fibers

| Run | Heat-treatment temperature | *1 Elongation | Appearance of fibers |
|---|---|---|---|
| 10 | 40°C | 150% | Breakable |
| 11 | 60°C | 220% | Breakable |
| 12 | 80°C | 450% | High elasticity |
| 13 | 95°C | 580% | High elasticity |
| *2 14 | — | 180% | Breakable |

*1 Indicated by an elongation at the time filaments of 5cm in length are drawn out to break down.
*2 The conventional spinning method, that is the fibers obtained by effecting the spinning at a pH of 1.0 to 2.0 and neutralizing with sodium carbonate to a pH of 6.0.

Table 4

| Elasticity of fibers, when chewed, by organoleptic test | |
| --- | --- |
| Members who estimate Run 10 acceptable | two persons |
| Members who estimate Run 12 acceptable | twenty-seven persons |
| Members who estimate Run 14 acceptable | one person |
| | Panel members: thirty persons |

What is claimed is:

1. Process for the preparation of edible protein fibers which comprises peptizing a water dispersion of isolated soybean proteins with an alkaline material, extruding the resulting peptized solution into a coagulating bath composed of (1) an aqueous acid solution exhibiting buffer action in the pH range of from about 4.2 to about 4.6 and (2) a salt to form fibrous proteins, and immediately thereafter contacting the resulting extruded fibers with hot water at a temperature of not less than about 80°C without stretching for a period of time of from 0.5 to 10 minutes.

2. Process according to claim 1, wherein said fibrous proteins are stretched before being contacted with hot water.

3. Process according to claim 1, wherein said acid solution contains acetic acid or succinic acid.

4. Process according to claim 1, wherein said aqueous acid solution contains acetic acid and other organic acids.

5. Process according to claim 1, wherein said aqueous acid solution contains acetic acid and an inorganic acid.

6. Process according to claim 1, wherein the amount of acid in said aqueous acid solution is at least about 2% by weight based on the total amount of said coagulating bath.

7. Process according to claim 1, wherein immediately after extruding, said fibers are contacted with the hot water and thereby shrunk to from about 50% to about 90% of the length of said fibers before their being contacted with the hot water.

* * * * *